United States Patent
Yamada et al.

(10) Patent No.: US 12,187,207 B2
(45) Date of Patent: Jan. 7, 2025

(54) ONBOARD POWER SOURCE SYSTEM AND DESIGN METHOD

(71) Applicant: Mazda Motor Corporation, Hiroshima (JP)

(72) Inventors: Sadahisa Yamada, Hiroshima (JP); Kazuichi Fujisaka, Hiroshima (JP); Masaaki Shimizu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 134 days.

(21) Appl. No.: 17/630,922

(22) PCT Filed: Jul. 17, 2020

(86) PCT No.: PCT/JP2020/027878
§ 371 (c)(1),
(2) Date: Jan. 28, 2022

(87) PCT Pub. No.: WO2021/020180
PCT Pub. Date: Feb. 4, 2021

(65) Prior Publication Data
US 2022/0266780 A1 Aug. 25, 2022

(30) Foreign Application Priority Data
Jul. 30, 2019 (JP) .................. 2019-139630

(51) Int. Cl.
*B60R 16/033* (2006.01)
(52) U.S. Cl.
CPC .................. *B60R 16/033* (2013.01)
(58) Field of Classification Search
CPC .................................................. B60R 16/033
USPC .................................................. 307/9.1, 10.1
See application file for complete search history.

(56) References Cited

U.S. PATENT DOCUMENTS

| | | | |
|---|---|---|---|
| 5,623,169 A * | 4/1997 | Sugimoto | B60R 16/0207 307/147 |
| 6,218,740 B1 * | 4/2001 | Mildice | H01R 31/005 307/42 |
| 6,700,386 B2 | 3/2004 | Egami | |
| 6,791,207 B2 * | 9/2004 | Yoshida | B60R 16/0315 307/10.6 |
| 10,780,847 B2 * | 9/2020 | Takamatsu | B60R 16/0207 |
| 11,021,118 B2 * | 6/2021 | Nakamura | G01R 3/00 |
| 2002/0113492 A1 | 8/2002 | Sakamoto et al. | |

(Continued)

FOREIGN PATENT DOCUMENTS

JP 2008-296790 A 12/2008

OTHER PUBLICATIONS

International Search Report and Written Opinion mailed on Oct. 13, 2020, received for PCT Application PCT/JP2020/02787, Filed on Jul. 17, 2020, 8 pages including English Translation.

*Primary Examiner* — Michael R. Fin
(74) *Attorney, Agent, or Firm* — XSENSUS LLP

(57) ABSTRACT

An onboard power source system includes: a main power source unit that supplies power; one or a plurality of power source hubs; a plurality of electronic devices; and a main power feeding cable that connects the one or plurality of power source hubs to the main power source unit, in which an electronic device related to power among the plurality of electronic devices and an electronic device related to traveling or safety among the plurality of electronic devices are connected to different power source hubs.

13 Claims, 6 Drawing Sheets

(56) References Cited

U.S. PATENT DOCUMENTS

2004/0227402 A1* 11/2004 Fehr .................... B60R 16/0315
307/10.1
2022/0396222 A1* 12/2022 Matsumura ....... H04L 12/40169

* cited by examiner

FIG.5

| No. | INTERVAL | TOTAL AMOUNT (A) OF CONTINUOUS CURRENT | VOLTAGE DROP (V) | CABLE DIAMETER (sq) |
|---|---|---|---|---|
| A | ① | 85 | 0.4 | 40 |
|   | ② | 67 | 0.4 | 40 |
|   | ③ | 23 | 0.2 | 30 |
|   | ④ | 80 | 0.3 | 30 |
|   | ⑤ | 58 | 0.2 | 20 |
|   | ⑥ | 23 | 0.2 | 20 |
| B | ① | 18 | 0.1 | 3 |
|   | ② | 67 | 0.7 | 2 |
|   | ③ | 23 | 1.0 | 10 |
|   | ④ | 22 | 1.0 | 20 |
|   | ⑤ | 58 | 0.4 | 3 |
|   | ⑥ | 23 | 0.3 | 8 |
| C | ① | 18 | 0.1 | 3 |
|   | ② | 44 | 0.7 | 2 |
|   | ③ | 23 | 0.3 | 5 |
|   | ④ | 22 | 0.7 | 5 |
|   | ⑤ | 35 | 0.4 | 3 |
|   | ⑥ | 23 | 0.4 | 5 |

ONBOARD POWER SOURCE SYSTEM AND DESIGN METHOD

CROSS-REFERENCE TO RELATED APPLICATIONS

The present application is based on PCT/JP2020/027878 filed on Jul. 17, 2020, and claims priority to Japanese Application No. 2019-139630 filed on Jul. 30, 2019, the entire contents of each are incorporated herein by reference.

TECHNICAL FIELD

The present invention relates to an onboard power source system and a design method thereof.

BACKGROUND ART

Conventionally, for example, a power distribution system of a vehicle such as a four-wheeled vehicle employs a configuration in which an electrical junction box such as a relay box including a fuse and a relay is disposed near a battery, and power is distributed from the electrical junction box to a large number of electronic devices via respective dedicated cables.

According to such a power distribution system, each electronic device can be driven at a stable voltage. However, in recent years, the number of electronic devices and various sensors has significantly increased for electrification and automation of vehicles, and accordingly, the number of cables has increased, and the design of an onboard power source system has become very complicated.

CITATION LIST

Patent Literature

Patent Literature 1: JP 2008-296790 A

SUMMARY OF INVENTION

Technical Problem

Therefore, a technique of providing a plurality of power control devices on a downstream side of a main power source and distributing power supplied from the main power source to terminal electronic devices and the like via the power control devices has been studied (hereinafter, this power distribution system is referred to as "zone power distribution"). However, when this technique is used, a large current flows through a specific cable (for example, a cable connecting a main power source and a power control device on a downstream side of the main power source), so that a significant voltage drop may occur in the cable. When a voltage drop occurs, a voltage applied to an electronic device mounted on a vehicle decreases, and there is a possibility that the electronic device cannot exhibit desired performance. In addition, a situation in which the electronic device cannot normally function may occur due to a significant voltage drop. Therefore, in performing zone power distribution, it is necessary to design a system so that a functional problem does not occur even if a voltage drop occurs.

In relation to the problem of voltage drop, for example, Patent Literature 1 discloses an invention for limiting a current required for wiper drive when a large voltage drop is predicted in a power source system of a vehicle. However, the invention disclosed in Patent Literature 1 relates to a single electronic device such as a wiper, and does not consider system design of the entire vehicle.

Therefore, an object of the present invention is to design an onboard power source system configured to be able to apply a stable voltage to at least a specific electronic device mounted on a vehicle without being affected by voltage drop even when the voltage drop occurs as described above.

Solution to Problem

In order to solve the above problem, an onboard power source system according to the present disclosure includes a main power source unit that supplies power; one or a plurality of power source hubs; a plurality of electronic devices; and a main power feeding cable that connects the one or plurality of power source hubs to the main power source unit, in which an electronic device related to power among the plurality of electronic devices and an electronic device related to traveling or safety among the plurality of electronic devices are connected to different power source hubs.

According to this configuration, in a vehicle including an onboard power source system configured by zone power distribution, it is possible to construct the onboard power source system in which even if a current flows through an electronic device related to power, an electronic device related to traveling or safety is not affected by voltage drop due to the current, and as a result, the vehicle can travel more safely.

In addition, the onboard power source system may further have a configuration in which the electronic device related to power includes a related device of a generator or an electric motor, the electronic device related to traveling includes a related device of an electric power steering, and the electronic device related to safety includes a related device of a brake.

According to this configuration, in a vehicle including the onboard power source system configured by zone power distribution, it is possible to construct the onboard power source system in which a related device of the electric power steering or brake is not affected by the voltage drop caused by the current flowing through the related device of the generator or electric motor, and as a result, the vehicle can travel more safely.

A design method of an onboard power source system according to the present disclosure, the onboard power source system including: a main power source unit that supplies power; one or a plurality of power source hubs; a plurality of electronic devices; and a main power feeding cable that connects the one or plurality of power source hubs to the main power source unit, the method including connecting an electronic device that contributes most to voltage drop among the plurality of electronic devices and an electronic device related to steering among the plurality of electronic devices to different power source hubs.

According to this method, in a vehicle including an onboard power source system configured by zone power distribution, it is possible to design the onboard power source system in which even if a current flows through an electronic device most contributing to voltage drop, an electronic device related to steering is not affected by voltage drop due to the current.

A design method of an onboard power source system according to the present disclosure, the onboard power source system including: a main power source unit that supplies power; one or a plurality of power source hubs; a plurality of electronic devices; and a main power feeding cable that connects the one or plurality of power source hubs to the main power source unit, the method including connecting an electronic device that contributes most to voltage drop among the plurality of electronic devices and an electronic device related to steering among the plurality of electronic devices to different power source hubs.

According to this method, in a vehicle including the onboard power source system configured by zone power distribution, it is possible to design an onboard power source system in which even if a current flows through an electronic device most contributing to voltage drop, an electronic device related to braking is not affected by voltage drop due to the current.

Advantageous Effects of Invention

According to the onboard power source system of the present invention, it is possible to design an onboard power source system in which even if a large voltage drop occurs due to a large current flowing through another electronic device, a stable voltage can be applied without being affected by the voltage drop to an electronic device that should not be affected by the voltage drop.

BRIEF DESCRIPTION OF DRAWINGS

FIG. 5 illustrates a cable diameter of a main power feeding cable, a voltage drop value, and a current value assumed to flow in FIGS. 4(A) to 4(C).

DESCRIPTION OF EMBODIMENT

Hereinafter, an embodiment of an onboard power source system according to the present invention will be described with reference to the accompanying drawings.

Figure 1:
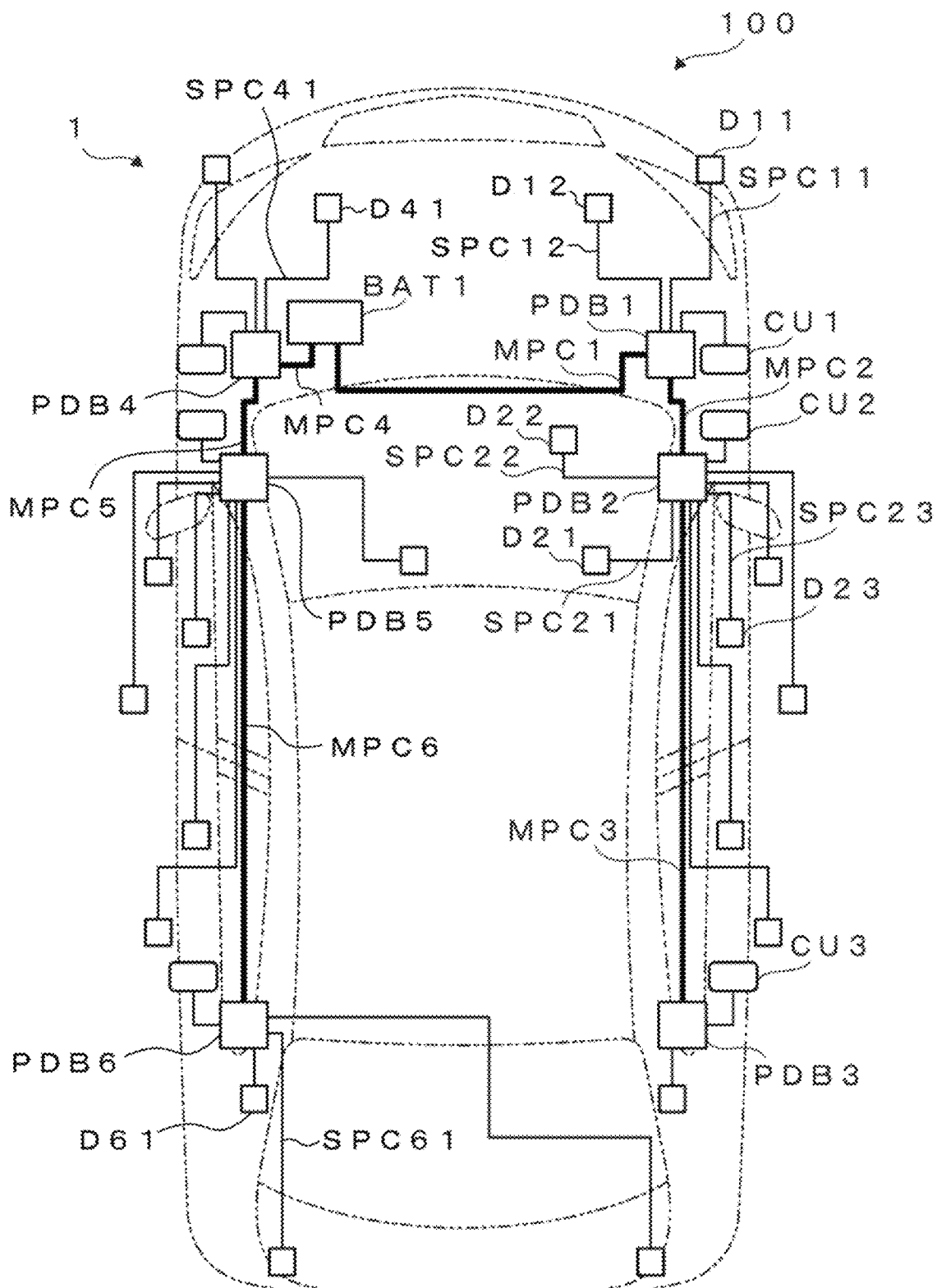
FIG. 1 illustrates a power source configuration of an onboard power source system according to an embodiment.

FIG. 1 illustrates a power source configuration of an onboard power source system 100 mounted on a vehicle 1 according to an embodiment of the present invention.

As shown in FIG. 1, the onboard power source system 100 includes a main power source unit BAT1, a plurality of power source hubs PDB1 to PDB6 directly or indirectly connected to the main power source unit BAT1 via main power feeding cables MPC1 to MPC6 [in the drawing, indicated by a thick solid line], and a plurality of electronic devices D11 and D21 to D23 connected to the plurality of power source hubs PDB, respectively, via sub power feeding cables SPC11, SPC12, SPC21 to SPC23, and SPC61 [in the drawing, indicated by a thin solid line]. Although the onboard power source system 100 of the embodiment includes the plurality of power source hubs PDB1 to PDB3, "power source hub PDB" will be simply described in the following description unless otherwise distinguished. The main power feeding cables MPC1 to MPC3, the sub power feeding cables SPC11 and SPC21 to SPC23, the electronic devices D11, D12, D21 to D23, D41, and D61, and control units CU1 to CU3 to be described below are also referred to as "main power feeding cables MPC", "sub power feeding cables SPC", "electronic devices D", and "control units CU", respectively, unless otherwise distinguished.

The main power source unit BAT1 is an arbitrary device having a function of supplying power, such as a battery or an alternator (generator). Although not illustrated, a component such as a fusible link including some sort of fuse may be connected between the main power source unit BAT1 and the main power feeding cable MPC connected to the main power source unit BAT1 to distribute the power source.

The power source hub PDB has a function of supplying power to a plurality of electronic devices D connected downstream of the power source hub PDB, and can control on/off of energization by the control unit CU to be described in detail later. The power source hub PDB may include a fuse that cuts off current by fusing when overcurrent flows or a relay capable of controlling the presence or absence of conduction. In the present specification, the "electronic device" includes any device that operates electrically mounted on a vehicle, such as an electronic device or an electric device.

The main power feeding cable MPC and the sub power feeding cable SPC may be cables capable of supplying electric power, and are configured by, for example, wire harnesses. Each cable is not necessarily a single cable, and may have a form in which a plurality of cables are connected by connecting means such as a connector.

There are a plurality of types of power sources of the vehicle, and the power sources can be classified into, for example, a +B power source, an ACC power source, and an IG power source. The power source state of the vehicle corresponds to the above classification. When the power source of the vehicle is off, only the electronic device connected to the +B power source is energized, and when the power source of the vehicle is the ACC, the electronic device connected to either the +B power source or the ACC power source is energized. When the power source of the vehicle is the IG, the electronic device connected to any one of the +B power source, the ACC power source, and the IG power source is energized.

The +B power source is a power source to which a voltage is always applied. For example, electronic devices that need to be energized even when the vehicle is not used, such as various controllers and a keyless device for operating a door lock device that wirelessly locks/unlocks a door from outside the vehicle, are connected to the +B power source.

The ACC power source is a power source to which an electronic device assumed to be used even when the user does not operate the engine (the engine is stopped), such as a music reproducing device, is connected.

The IG power source is, for example, a power source to which an electronic device used for operation of the engine or an electronic device assumed to be used basically during engine start, such as a camera used in an advanced driver assistance system (ADAS), is connected. However, depending on the electronic device, as long as the power source state of the vehicle is IG, the electronic device can be used even while the engine is stopped.

In an embodiment, as shown in FIG. 1, the plurality of power source hubs PDB may be connected in a row through a main power feeding cable MPC. Such a configuration is also called a daisy chain.

Although not illustrated, in the conventional onboard power source system, in the electrical junction box near the battery, the downstream side of the +B power source or a part of the +B power source is divided into the ACC power source and the IG power source by, for example, a plurality of relays, and the downstream side is connected to each electronic device by a dedicated cable thereof, thereby supplying necessary power to each electronic device. However, by adopting the configuration of FIG. 1, the function of the electrical junction box disposed near the battery of the vehicle can be provided at the position where the power source hub is disposed (for example, near the occupant in the rear seat of the vehicle). Hereinafter, the connection using the daisy chain is referred to as "daisy chain connection", and the conventional power source configuration is referred to as "centralized power distribution connection".

In the embodiment, the onboard power source system 100 includes a control unit CU (for example, ECU), and is configured to give an instruction to the corresponding power source hub PDB through the control unit CU to switch on and off of energization of some power source state (e.g. +B power source, ACC power source or IG power source) to the electronic device D downstream of the power source hub PDB, thereby controlling start/stop of the electronic device connected to the downstream side of the power source hub PDB. The control unit CU may be controlled by, for example, a control signal from a central processing unit that controls the entire vehicle. In the present embodiment, the control unit CU is provided separately from the power source hub PDB, but may be provided in the power source hub PDB. Hereinafter, a range of electronic devices that can be powered by a certain power source hub PDB through control by the control unit CU is referred to as a "zone". Further, a power source configuration in which power is distributed from a power source hub connected by a main power feeding cable and arranged at each position of the vehicle to each electronic device is referred to as "zone power distribution".

In the zone power distribution of the embodiment, the downstream side of the power source hub PDB is connected by the sub power feeding cable SPC for each electronic device, but the upstream side is bundled into one common main power feeding cable MPC. Therefore, there is a possibility that a current passing through the electronic device on the downstream side simultaneously flows through the same main power feeding cable. For example, when a plurality of power source hubs PDB (for example, the first power source hub PDB1, the second power source hub PDB2, and the third power source hub PDB3) are connected in daisy chain connection as shown in the embodiment of FIG. 1, in addition to the current of the electronic device on the downstream side of the first power source hub PDB1, the current flowing through the second power source hub PDB2 and the third power source hub PDB3 flows to the main power feeding cable MPC1 upstream of the first power source hub PDB1. Therefore, the current flowing through the first power source hub PDB1 on the upstream side may become large. Therefore, it is considered that a temporary voltage drop due to the simultaneous operation of the electronic devices D frequently occurs, and as a result, the current flowing through the main power feeding cable MPC increases, and the voltage drop amount at the main power feeding cable MPC also increases.

Therefore, it is necessary to design the power source system so that the electronic device D does not malfunction due to the voltage drop.

Meanwhile, the current flowing through the electronic device D mounted on the vehicle can be classified into, for example, "continuous current", "intermittent current", and "inrush current". The continuous current is a current flowing through an electronic device in which a current constantly flows for a relatively long time. For example, a current flowing through an engine control module (PCM) that controls an engine after starting is classified as a continuous current. In addition, a current flowing through a head lamp (headlight), audio, or the like operated by an operation of a driver is also classified as a continuous current. Hereinafter, the electronic device to which the continuous current is supplied is referred to as a "continuous load".

The intermittent current is a current whose energization time is functionally limited. For example, a current flowing through an electronic device such as a power window motor (hereinafter, a PW motor) that moves a window glass of a side door of a vehicle up and down or a door lock motor that locks/unlocks a door key through a signal of a door lock device is classified as an intermittent current. Hereinafter, the electronic device to which the intermittent current is supplied is referred to as an "intermittent load".

The inrush current is a large current that temporarily flows when the electronic device is powered on, and is, for example, a large current that flows at the time of starting the electronic device such as a head lamp, a PW motor, or a door lock motor. Even in an electronic device (for example, audio or the like) other than the electronic device described above, there is a possibility that a current larger than the normal current flows at the time of starting, but in a case where the influence is minor, it may not be considered in the design of the power source system.

Naturally, these continuous current, intermittent current, and inrush current do not flow simultaneously in one electronic device, but in a power source hub that supplies power to a plurality of electronic devices, these currents may flow simultaneously. The occurrence of such an event will be described.

Figure 2:
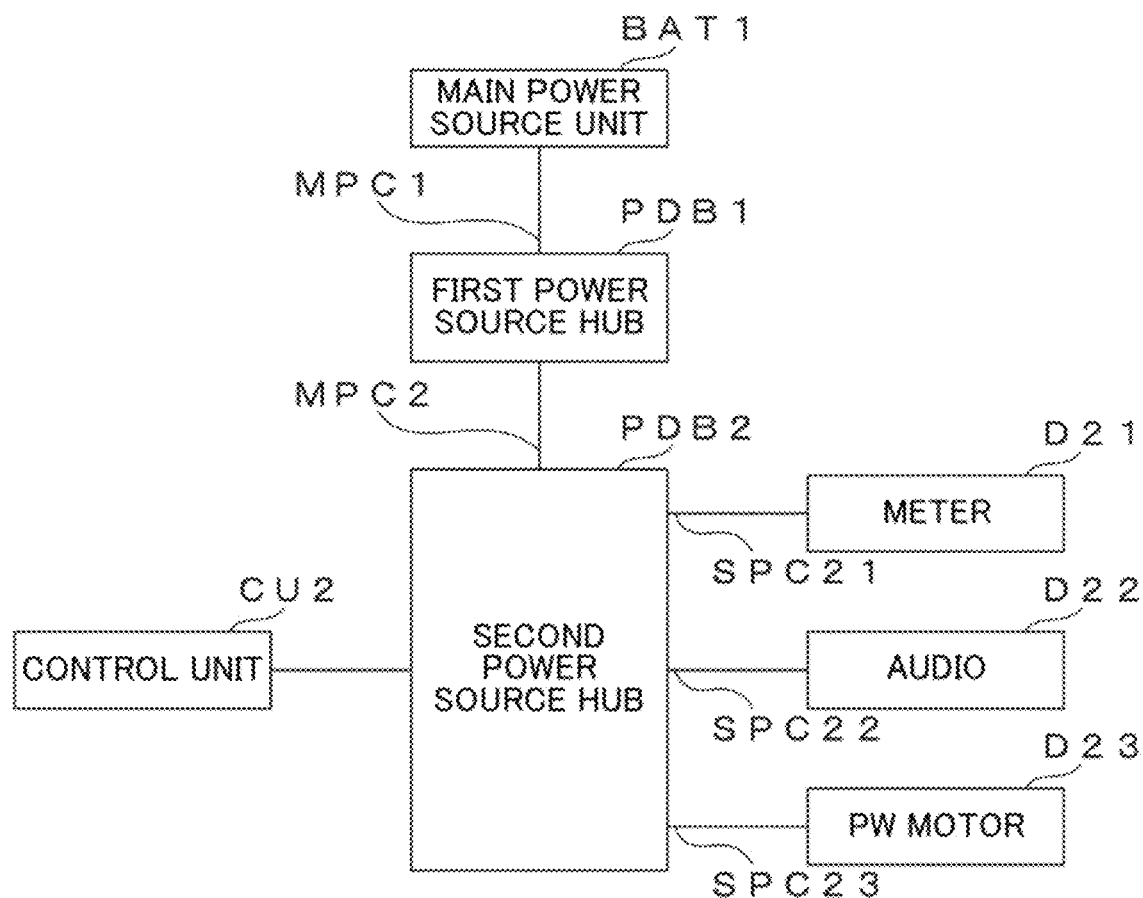
FIG. 2 illustrates an example of an electronic device connected to a second power source hub.
Figure 3:
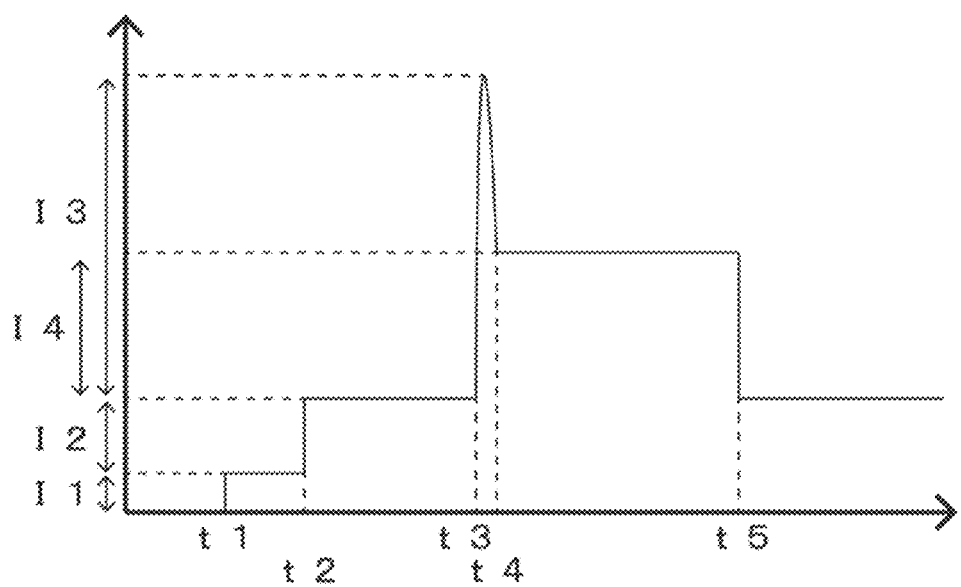
FIG. 3 schematically illustrates an example of a current flowing through a main power feeding cable connected to the second power source hub illustrated in FIG. 2.

FIG. 2 is a diagram illustrating an example of an electronic device included in a zone related to the second power source hub PDB2 in the onboard power source system 100 illustrated in FIG. 1. FIG. 3 is a diagram schematically illustrating simultaneous energization of a plurality of electronic devices, and illustrates a current flowing through the second power source hub PDB2. As described in FIG. 2, the second power source hub PDB2 is connected to the main power source unit BAT1 via the main power feeding cable MPC2, the first power source hub PDB1, and the main power feeding cable MPC1. The second power source hub PDB2 is connected to a meter D21, an audio D22, and a PW motor D23. The meter D21 is an electronic device through which a continuous current flows, and is basically always energized during engine start. The audio D22 is also an electronic device through which a continuous current flows, and is automatically energized by a user's operation or depending on settings. The PW motor D23 corresponds to an electronic device through which an intermittent current and an inrush current flow, and an inrush current flows at the time of starting the motor, and then the current flows intermittently.

With reference to FIG. 3, the current flowing through the main power feeding cable MPC2 via the second power source hub PDB2 will be described. First, at time t1, the engine is started, and a continuous current I1 flows through the meter D21. Next, when the user turns on the switch of the audio D22 at time t2, a continuous current I2 flows through the audio D22. At this time, a continuous current of I1+I2 flows through the main power feeding cable MPC2 upstream of the second power source hub PDB2. Thereafter, when the user operates the raising switch of the window glass at time t3, a current flows through the PW motor D23. At this time, an inrush current of maximum I3 flows between time t3 and time t4 immediately after the operation. When the operation of the motor is stabilized, the current value is stabilized, and an intermittent current I4 flows. Next, when the operation of the raising switch is ended at time t5, the energization to the PW motor D23 is ended. While the PW motor D23 is operating, a maximum current of I1+I2+I3 flows through the main power feeding cable MPC2 upstream of the second power source hub PDB2 between time t3 and time t4, and a current of I1+I2+I4 flows through the main power feeding cable MPC2 between time t4 and time t5.

As described above, a much larger inrush current temporarily flows through the main power feeding cable MPC upstream of the power source hub PDB while the continuous current and the intermittent current flow, and a large voltage drop occurs at that time. Although FIG. 3 shows only two electronic devices, the meter D21 and the audio D22, many electronic devices requiring continuous current may be used simultaneously. Furthermore, the voltage of the main power source unit (both a storage battery and an alternator are included) may temporarily decrease depending on the magnitude of the current to be output. Therefore, even if current is simultaneously requested from a plurality of electronic devices connected to the common main power feeding cable MPC, it is necessary to design a system that ensures a minimum function of necessary electronic devices without causing excessive voltage drop.

Meanwhile, in addition to the rated voltage (generally about 12 V), a performance guarantee voltage and a function maintaining voltage are set in the electronic device. The performance guarantee voltage is a voltage that can guarantee operation with a predetermined performance within the voltage range, and is, for example, 8 V to 13 V. The function maintaining voltage is a voltage that cannot satisfy a predetermined performance but can operate at least a basic function, and is, for example, 5 V to 15 V. The range of these voltage values varies depending on the price, specification, performance, and the like.

The onboard power source system of the embodiment ensures a minimum function of necessary electronic devices even in a state where a voltage drops due to a voltage drop or the like. Therefore, it is preferable to design the onboard power source system such that, instead of assuming a situation in which all the assumed inrush currents are generated at the same time, even when the continuous current and the intermittent current are requested in a path from the main power source unit to the electronic devices via a power source hub from all the electronic devices connected to the power source hub, power not less than the minimum performance guarantee voltage value is supplied to the electronic devices, and even when the inrush current is requested in addition to the continuous current, power not less than the minimum function maintaining voltage value is supplied to the electronic devices.

Before describing the onboard power source system designed for such a purpose, the voltage drop will be described using, for example, the meter D21 connected to the power source hub PDB2 in FIG. 1 as an example. It is assumed that, for example, a rated voltage of 12 V, a minimum performance guarantee voltage of 8 V, and a minimum function maintaining voltage of 6 V are set for the meter D21. Under this condition, when the battery terminal voltage is, for example, 13.5 V, it is preferable that a voltage larger than the rated voltage of 12 V be supplied to the meter D21 even in a situation where a continuous current is supplied from the power source hub PDB2 to all the continuous loads connected to the downstream side of the power source hub PDB2. In addition, it is preferable that a voltage larger than the minimum performance guarantee voltage of 8 V be supplied to the meter D21 even in a situation where the continuous current is supplied from the power source hub PDB2 to all the continuous loads connected to the downstream side of the power source hub PDB2 and the intermittent current is supplied to all the intermittent loads. Further, it is preferable that a voltage larger than the minimum function maintaining voltage of 6 V be supplied to the meter D21 even in a situation where the continuous current is supplied from the power source hub PDB2 to all the continuous loads connected to the downstream side of the power source hub PDB2, and the remaining electronic devices (loads) are powered on to generate the inrush current.

Therefore, it is desirable that the onboard power source system is designed in consideration of an energization mode (continuous current, intermittent current, inrush current), a current value, a rated voltage, a minimum performance guarantee voltage, a minimum function maintaining voltage, a possible voltage drop value when the electronic device is started, and a voltage value when the battery terminal voltage is the lowest in normal use of the vehicle for all the electronic devices connected to the power source hub placed on the main power feeding cable. Here, when the plurality of power source hubs PDB are connected in series by the daisy chain connection, the voltage drop is preferably considered for all the cables from the upstream main power source unit BAT1 to the downstream electronic device D. Specifically, in the case of the configuration illustrated in FIG. 2, it is preferable to consider the voltage drop occurred in the main power feeding cable MPC1, the main power feeding cable MPC2, and the sub power feeding cable SPC21.

In order to satisfy the rated voltage, the minimum performance guarantee voltage, and the minimum function maintaining voltage for each electronic device D, it is desirable to increase the diameter of the cable related to the electronic device D or change the power source hub PDB to which the electronic device D is connected.

Generally, in the case of the same type of cable (for example, a wire harness), cable resistance decreases when the cable diameter is increased. However, when the cable diameter increases, problems in vehicle design occur, such as a large space is required for routing, and assembly becomes difficult. When the power source hub PDB to be connected is changed, the sub power feeding cable SPC becomes longer as the power source hub PDB becomes farther, and there may be a new problem that the cable diameter of the sub power feeding cable SPC needs to be increased in order to reduce the voltage drop by the sub power feeding cable SPC. Naturally, as the number of such electronic devices increases, wiring becomes considerably complicated. Therefore, a method of coping with the voltage drop by changing the number of main power feeding cables MPC directly connected to the main power source unit BAT1 is also conceivable.

Figure 4:
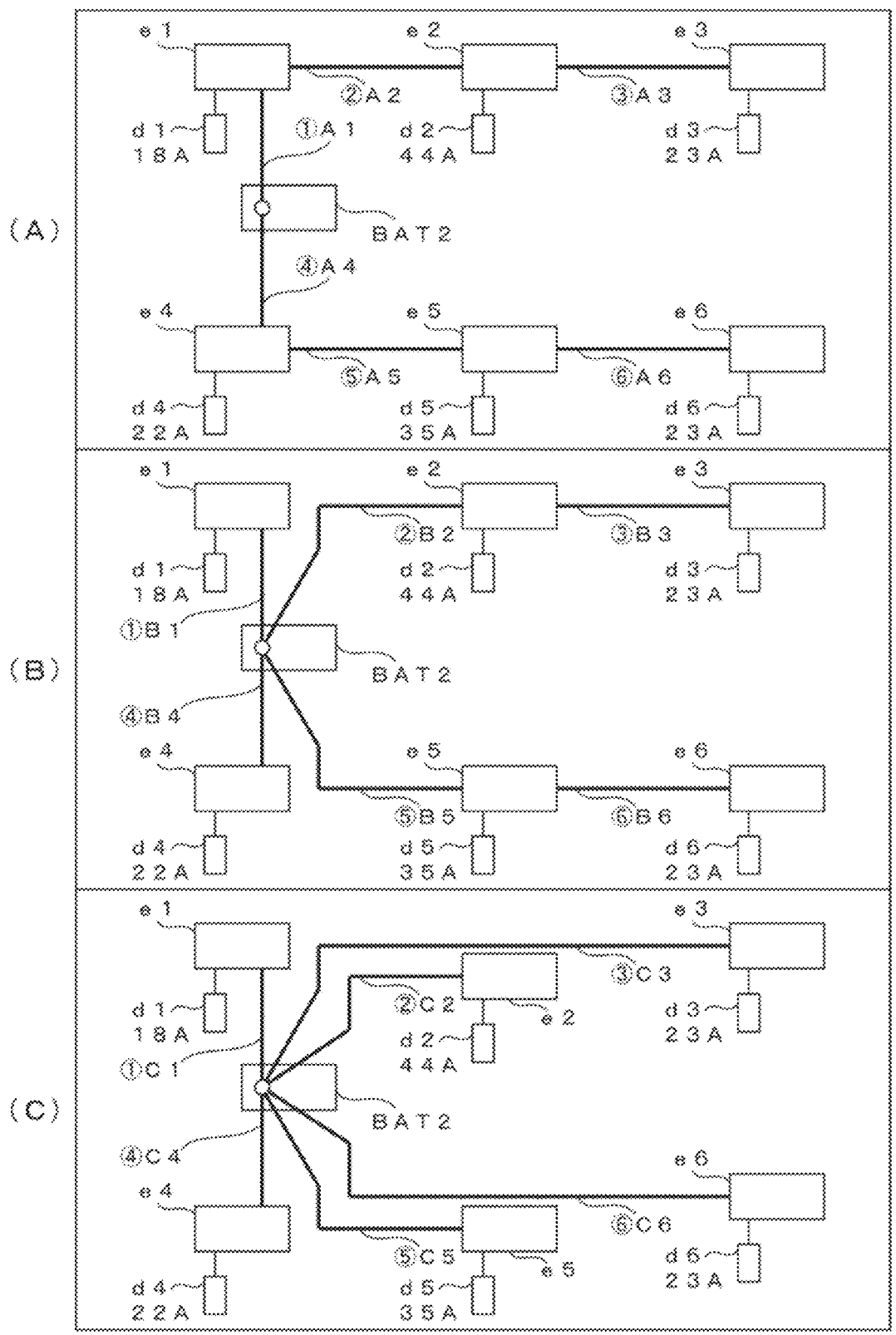
FIGS. 4(A), 4(B), and 4(C) illustrate examples of schematic views of a cable configuration in a case where there are two, four, and six main power feeding cables connected to a main power source unit, respectively.

FIG. 4 illustrates a plurality of cable configurations in which the number of main power feeding cables connected to the main power source unit is changed. Here, for the six power source hubs e1 to e6, two main power feeding cables A1 and A4 in the configuration of FIG. 4(A), four main power feeding cables B1, B2, B4, and B5 in the configuration of FIG. 4(B), and six main power feeding cables C1 to C6 in the configuration of FIG. 4(C) are connected to the main power source unit BAT2. The power source hubs e1 to e3 and the power source hubs e4 to e6 illustrated in FIG. 4 (A) and the power source hubs e2 and e3 and the power source hubs e5 and e6 illustrated in FIG. 4 (B) are connected in daisy chain connection with respect to the main power feeding cable. Each of the power source hubs e1 to e6 illustrated in FIG. 4 (C) is directly connected to the main power source unit BAT2 via the main power feeding cable. Hereinafter, the connection mode illustrated in FIG. 4(C) is referred to as "star connection". Since the power source hubs e1, e4 described in FIG. 4(A) and the power source hubs e1, e2, e4, e5 described in FIG. 4(B) are each a star connection, FIGS. 4(A) and 4(B) illustrate a mode in which a star connection and a daisy chain connection are combined.

Although not illustrated in detail for simplicity, each of the power source hubs illustrated in FIGS. 4(A) to 4(C) has a plurality of electronic devices connected downstream via a sub power feeding cable, and for example, a plurality of electronic devices connected downstream of the power source hub e3 is illustrated as an electronic device d3. The numerical value described near each electronic device is the total amount of continuous current of the electronic device.

For each of the cable configurations illustrated in FIGS. 4(A) to 4(C), the total amount (A: amperes) of the continuous current flowing through the main power feeding cables A1 to A6, B1 to B6, and C1 to C6, the voltage drop (V: volt) due to the continuous current, and the cable diameter (cable size) (sq: square) of the main power feeding cable are illustrated in FIG. 5. In FIG. 5, A to C in the No column mean the configurations of FIGS. 4(A) to 4(C), respectively.

As is clear from FIG. 5, in the case of the cable configuration of FIG. 4(A), for example, a continuous current supplied to the electronic devices d1, d2, and d3 flows through the main power feeding cable A1, and the total amount thereof is 85 A at the maximum. The cable diameter corresponding to the maximum current of 85 A is 40 sq. The voltage drop value is determined by the cable resistance per unit length and the cable length, and is, for example, 0.3 V. In addition, the maximum continuous current flowing through the main power feeding cable A2 is 67 A, the cable diameter corresponding thereto is 30 sq, and the voltage drop value is 0.3 V. When these voltage drop values are not acceptable, the voltage drop value is adjusted by increasing the cable diameter. Alternatively, the voltage drop value may be adjusted by changing the routing path of the main power feeding cable or changing the power source hub to be connected. Thus, the position of the power source hub, the cable diameter, and the like are determined in consideration of the total amount of the continuous current, the intermittent current, and the inrush current, and the voltage drop associated therewith.

When the main power feeding cable diameter required in the configuration of FIG. 4(A) becomes too large, the number of main power feeding cables connected downstream of the main power source unit BAT2 may be changed as illustrated in FIG. 4(B) or FIG. 4(C). In the configuration of FIG. 4(B), since the power source hub e1 and the power source hub e4 are not connected in daisy chain connection, the total amount of continuous current flowing through the main power feeding cable B1 and the main power feeding cable B4 connected upstream of the power source hub e1 and the power source hub e4 is reduced, and the cable diameter can be reduced. In addition, by performing such a change, the degree of freedom of the positions of the power source hub e1 and the power source hub e4 is improved, and more preferable routing can be performed. FIG. 4 (C) is an example of a configuration in which the total amount of the continuous current is further lower than that in FIG. 4(B).

Some electronic devices connected to the power source hub use a large amount of current. When the current to such an electronic device is supplied/cut off via the main power feeding cable, the voltage drop value generated in the main power feeding cable changes significantly, and as a result, the voltage applied to other electronic devices connected to the downstream side changes. As such an electronic device, for example, a component related to the power of the vehicle such as a motor such as a generator or an electric motor, a PTC heater, or the like can be considered.

In some electronic devices, the behavior thereof greatly changes due to the change in the applied voltage, and it is necessary to minimize the influence of the change in the voltage drop on such electronic devices. As such an electronic device, for example, an electronic device related to traveling or safety of a vehicle (for example, an electric power steering device, a braking device, or the like) related to "running, turning, and stopping" can be considered. Therefore, for example, an electronic device that contributes most to the voltage drop among the plurality of electronic devices and an electronic device related to steering among the plurality of electronic devices are connected to power source hubs different from each other. Here, the "electronic device that contributes most to the voltage drop" may refer to, for example, a group of electronic devices having the largest amount of current to be used among a plurality of groups when the plurality of electronic devices are divided into the plurality of groups in accordance with the "magnitude of the amount of current to be used". Examples of the "electronic device that contributes most to the voltage drop" include the above-described components related to the power of the vehicle such as a motor such as a generator or an electric motor, a PTC heater, or the like.

Specifically, for example, in FIG. 1, a related device (hereinafter, referred to as power-related device) of a generator or an electric motor is connected to a position D12, and an electronic device (hereinafter, referred to as steering related device) related to steering is connected to a position D41. Then, the power-related device is connected to the power source hub PDB1 via the sub power feeding cable SPC12. On the other hand, the steering-related device is connected to the power source hub PDB4 via the sub power feeding cable SPC41. The power source hub PDB4 is connected to the main power source unit BAT1 via the main power feeding cable MPC4. The power-related device is an example of an electronic device related to power.

For example, in the configuration of FIG. 4(A), when the PTC heater is disposed downstream of the power source hub e1, the electric power steering device is preferably connected to, for example, the downstream of the power source hub e4 or directly connected to a power source distribution device such as a fusible link generally attached to the main power source unit BAT2 or the like via a cable without being connected to the downstream of any power source hub.

In addition, it is desirable to construct an onboard power source system in which an electronic device related to traveling or safety is not affected by a voltage drop due to a current even if the current flows through the electronic device related to power. Therefore, an electronic device related to power among the plurality of electronic devices and an electronic device related to traveling or safety among the plurality of electronic devices are connected to the power source hubs different from each other.

Specifically, for example, in FIG. 1, a power-related device is connected to the position D12, and an electric power steering-related device (hereinafter, referred to as a traveling-related device) is connected to the position D41. Then, the power-related device is connected to the power source hub PDB1 via the sub power feeding cable SPC12. On the other hand, the traveling-related device is connected to the power source hub PDB4 via the sub power feeding cable SPC41. The traveling-related device is an example of an electronic device related to traveling.

In another example, for example, in FIG. 1, a power-related device is connected to the position D12, and a related device of a brake (hereinafter, referred to as a brake-related device) is connected to a position D61. Then, the power-related device is connected to the power source hub PDB1 via the sub power feeding cable SPC12. On the other hand, the brake-related device is connected to a power source hub PDB6 via a sub power feeding cable SPC61. The power source hub PDB6 is connected to a power source hub PDB5 via a main power feeding cable MPC6, and the power source hub PDB5 is connected to the power source hub PDB4 via a main power feeding cable MPC5. The brake-related device is an example of an electronic device related to safety.

Figure 6:
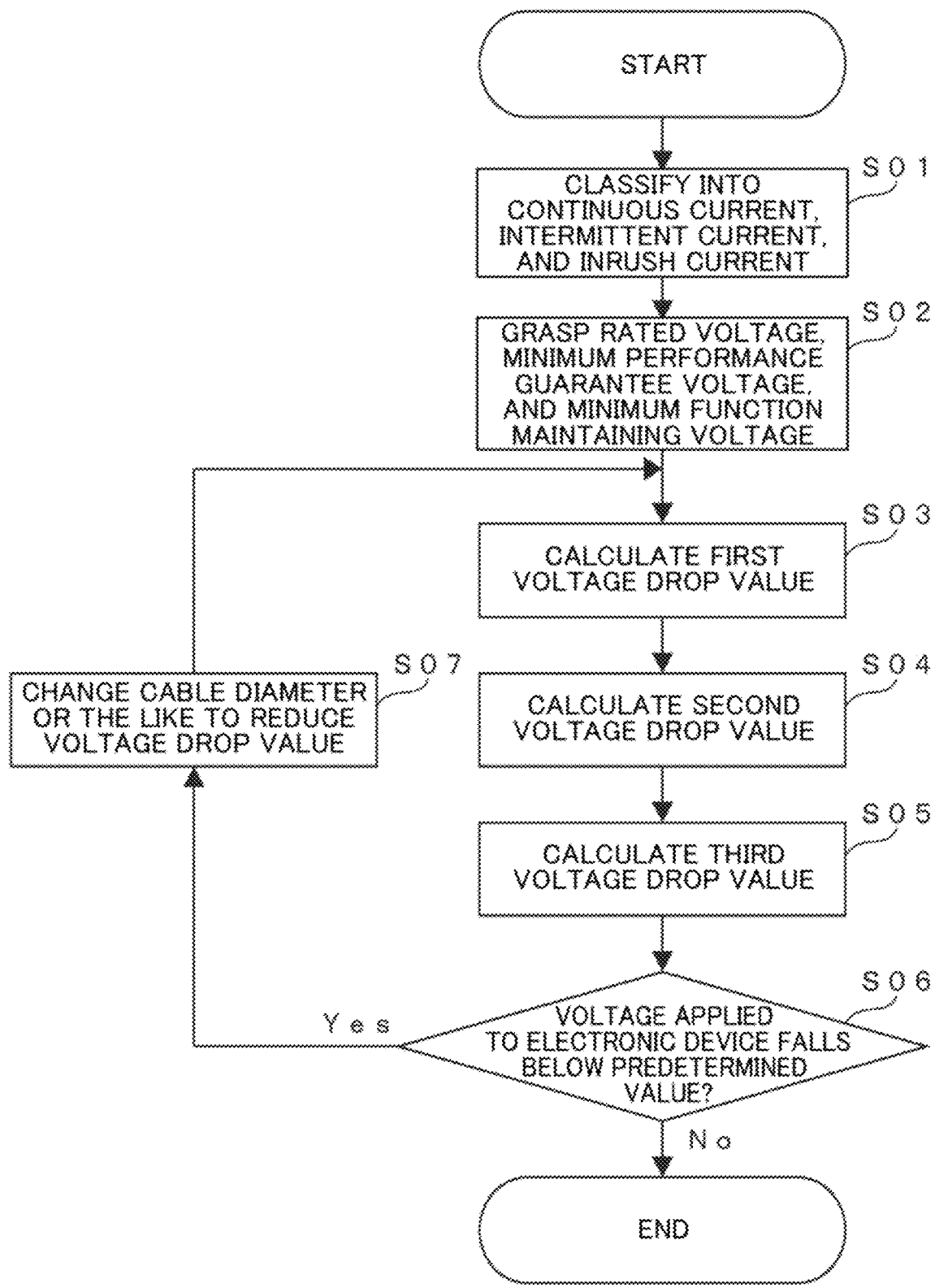
FIG. 6 illustrates a flowchart of a design method of the onboard power source system according to the present embodiment.

Next, a design process of the onboard power source system according to the embodiment will be described with reference to the flowchart of FIG. 6.

First, the current flowing through each electronic device provided in the onboard power source system is classified into a continuous current, an intermittent current, and an inrush current (S01).

In addition, a rated voltage, a minimum performance guarantee voltage, or a minimum function maintaining voltage that the electronic device can have is grasped and stored (S02).

Next, the total amount of the continuous current flowing through the main power feeding cable is calculated, a cable diameter capable of energizing the total amount of the continuous current is selected, and a first voltage drop value that is reduced by the continuous current flowing through the main power feeding cable and the sub power feeding cable is calculated (S03). In addition, a second voltage drop value that is further reduced by at least one intermittent current flowing through the main power feeding cable with respect to the first voltage drop value is calculated (S04). Further, a third voltage drop value that is further reduced by at least one inrush current flowing through the main power feeding cable with respect to the first voltage drop value is calculated (S05).

It is checked whether the voltage applied to each electronic device falls below the rated voltage even if the voltage decreases by the first voltage drop value, whether the voltage applied to each electronic device falls below the minimum performance guarantee voltage even if the voltage decreases by the second voltage drop value, and whether the voltage applied to each electronic device falls below the minimum function maintaining voltage even if the voltage decreases by the third voltage drop value (S06). When the voltage falls below, the cable diameter is changed, the power source hub to which the electronic device is connected is changed, and/or the connection destination of the main power feeding cable of the power source hub is changed (S07).

Then, the above (S03) to (S07) are repeated until the voltage applied to each electronic device does not fall below the predetermined voltage.

The present invention is not limited to the illustrated embodiment, and various improvements and design changes can be made without departing from the gist of the present invention.

INDUSTRIAL APPLICABILITY

As described above, according to the onboard power source system of the present invention, in the vehicle including the onboard power source system configured by the zone power distribution, even if the power source hub for distributing the power source is arranged in various places of the vehicle, or even if a voltage drop occurs in the main power feeding cable due to a large current flowing through another electronic device, a stable voltage can be applied to the electronic device that should not be affected by the voltage drop without being affected by the voltage drop, and thus, the onboard power source system can be suitably used in the design of the power source configuration of the vehicle.

The invention claimed is:

1. An onboard power source system, comprising:
   a main power source that supplies power;
   a plurality of power source hubs;
   a plurality of electronic devices connected to one of the plurality of power source hubs; and
   a plurality of power feeding cables that connect to the plurality of power source hubs to the main power source, wherein
   the plurality of power source hubs are arranged on a power source routing path between the main power source and the plurality of electronic devices and are configured to supply electric power from the main power source to the plurality of electronic devices connected to the plurality of power source hubs,
   each power feeding cable feeds electric power from the main power source to the plurality of power source hubs, and
   an electronic device related to power among the plurality of electronic devices and an electronic device related to traveling or safety among the plurality of electronic devices are connected to different power source hubs that are directly connected to the main power source via different power feeding cables of the plurality of power feeding cables wherein the plurality of power source hubs are arranged in a star configuration such that each power source hub is directly connected to the main power source via a different one of the plurality of power feeding cables.

2. The onboard power source system according to claim 1, wherein
   the electronic device related to power includes a related device of a generator or an electric motor,
   the electronic device related to traveling includes a related device of an electric power steering, and
   the electronic device related to safety includes a related device of a brake.

3. A design method of an onboard power source system which includes:
   a main power source that supplies power;
   a plurality of power source hubs;
   a plurality of electronic devices connected to one of the plurality of power source hubs; and
   a plurality of power feeding cables that connect the plurality of power source hubs to the main power source, wherein the plurality of power source hubs are arranged on a power source routing path between the main power source and the plurality of electronic devices and are configured to supply electric power from the main power source to the plurality of the electronic devices connected to the plurality of power source hubs, and each of the plurality of feeding cables feeds electric power from the main power source to the plurality of power source hubs, the method comprising:
connecting, to one of the plurality of power source hubs, an electronic device that contributes most to voltage drop among the plurality of electronic devices, the one of the plurality of power source hubs being directly connected to the main power source via one of the plurality of power feeding cables; and connecting an electronic device related to steering among the plurality of electronic devices to different power source hubs from the one of the plurality of power source hubs, the different power source hubs being directly connected to the main power source via different power feeding cables from the one of the plurality of power feeding cables wherein the plurality of power source hubs are arranged in a star configuration such that each power source hub is directly connected to the main power source via a different one of the plurality of power feeding cables.

4. A design method of an onboard power source system which includes:
a main power source that supplies power;
a plurality of power source hubs;
a plurality of electronic devices connected to one of the plurality of power source hubs; and
a plurality of power feeding cables that connect the plurality of power source hubs to the main power source, wherein
the plurality of power source hubs are arranged on a power source routing path between the main power source and the plurality of electronic devices and are configured to supply electric power from the main power source to the plurality of electronic devices connected to the plurality of power source hubs, and
each power feeding cable feeds electric power from the main power source to the plurality of power source hubs,
the method comprising:
connecting, to one of the plurality of power source hubs, an electronic device that contributes most to voltage drop among the plurality of electronic devices, the one of the plurality of power source hubs being directly connected to the main power source via one of the plurality of power feeding cables; and connecting an electronic device related to braking among the plurality of electronic devices to different power source hubs from the one of the plurality of power source hubs, the different power source hubs being directly connected to the main power source via different power feeding cables from the one of the plurality of power feeding cables wherein the plurality of power source hubs are arranged in a star configuration such that each power source hub is directly connected to the main power source via a different one of the plurality of power feeding cables.

5. The onboard power source system according to claim 1, wherein the main power source includes a battery.

6. The onboard power source system according to claim 1, wherein the main power source includes an alternator.

7. The onboard power source system according to claim 1, wherein at least one of the plurality of power source hubs includes a fuse.

8. The onboard power source system according to claim 1, wherein at least one of the plurality of power source hubs is configured to control supply of the electric power based on a state of a vehicle in which the onboard power source system is disposed.

9. The onboard power source system according to claim 8, wherein the state of the vehicle includes an off state, a state where an engine of the vehicle is stopped, and a state where the engine of the vehicle is on.

10. The onboard power source system according to claim 9, wherein the at least one of the plurality of power source hubs is configured to supply the electric power to a keyless entry system of the vehicle when the vehicle is in the off state.

11. The onboard power source system according to claim 10, wherein the at least one of the plurality of power source hubs is configured to supply the electric power to a music reproducing device when the vehicle is in the state where the engine of the vehicle is stopped.

12. The onboard power source system according to claim 11, wherein the at least one of the plurality of power source hubs is configured to supply the electric power to an advanced driver assistance system (ADAS) when the vehicle is in the state where the engine of the vehicle is on.

13. The onboard power source system according to claim 8, wherein the at least one of the plurality of power source hubs is configured to control the supply of the electric power based on instructions from a controller.

* * * * *